(12) United States Patent
Park et al.

(10) Patent No.: US 6,936,380 B2
(45) Date of Patent: Aug. 30, 2005

(54) PROCESS FOR PREPARING LITHIUM POLYMER SECONDARY BATTERY

(75) Inventors: Jung-Ki Park, Taejon (KR); Won-Sun Kim, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 266 days.

(21) Appl. No.: 10/102,666

(22) Filed: Mar. 22, 2002

(65) Prior Publication Data

US 2002/0138972 A1 Oct. 3, 2002

(30) Foreign Application Priority Data

Apr. 2, 2001 (KR) ........................................ 2001-17478

(51) Int. Cl.[7] ............................................... H01M 2/00
(52) U.S. Cl. ................... 429/231.95; 429/129; 429/131
(58) Field of Search ........................... 429/231.95, 129, 429/131, 132, 136, 137

(56) References Cited

U.S. PATENT DOCUMENTS

| | | | | | |
|---|---|---|---|---|---|
| 5,384,213 | A | * | 1/1995 | Olsen | .......................... 429/317 |
| 6,174,626 | B1 | * | 1/2001 | Kojima et al. | .............. 429/306 |
| 2002/0018935 | A1 | * | 2/2002 | Okada | ................... 429/231.95 |
| 2002/0071915 | A1 | * | 6/2002 | Schubert et al. | ......... 427/385.5 |

OTHER PUBLICATIONS

Borghini et al.; Reliability of Lithium Batteries with Crosslinked Polymer Electrolytes; *Electrochimica Acta.*; 41(15): 2369–2373 (1996).

Aihara et al.; Characteristics of a Thin Film Lithium–ion Battery Using Plasticized Solid Polymer Electrolyte, *J. Power Sources*, 65:143–147 (1997).

\* cited by examiner

*Primary Examiner*—Michael Barr
*Assistant Examiner*—Monique Wills
(74) *Attorney, Agent, or Firm*—Jacobson Holman PLLC

(57) ABSTRACT

The present invention relates to a novel process for preparing a lithium polymer secondary battery which comprises a step of direct coating of a plasticized and crosslinked polymer electrolyte onto a lithium electrode. The process for preparing a lithium polymer secondary battery comprises the steps of: (i) dissolving a mixture of a crosslinking agent and a monomer in a molar ratio of 1:1 to 1:11 in a liquid electrolyte of 100 to 400% (w/w) to obtain a polymer electrolyte; (ii) applying the polymer electrolyte onto one side of a lithium electrode and treating with heat or UV to obtain a polymer-coated electrode; and, (iii) bonding the polymer-coated electrode to a positive electrode. In accordance with the present invention, a lithium polymer secondary battery with an improved interfacial stability between a lithium electrode and a polymer electrolyte can be prepared in a simple manner, which makes possible its wide application in the development of lithium polymer secondary battery.

5 Claims, 2 Drawing Sheets

PROCESS FOR PREPARING LITHIUM POLYMER SECONDARY BATTERY

FIELD OF THE INVENTION

The present invention relates to a process for preparing a lithium polymer secondary battery, more specifically, to a process for preparing a lithium polymer secondary battery which comprises a step of direct coating of a plasticized and crosslinked polymer electrolyte onto a lithium electrode and a lithium polymer secondary battery produced thereby.

BACKGROUND OF THE INVENTION

With the rapid progress of electronics, telecommunication and computer industries, demands for secondary batteries with high-performance and high-stability have been continuously increased in the art. In particular, in line with the increased consumption of compact, thin, light and portable electronic products, a secondary battery which is one of essential parts of the products, has been developed to meet the needs of small and light weight ones. In addition, as the number of automobiles is increased, the environmental destruction such as air or noise pollution as well as the petroleum exhaustion have been regarded as serious social problem, which drives the researchers to develop an alternative energy source and batteries having high generating power and high energy density.

Under the circumstances, a lithium polymer battery ("LPB") has been proposed as one of the high-performance batteries for the next generation. LPB has a larger energy density per unit weight than that of conventional ones and can be processed in a diverse form, which eases the manufacture of high-voltage and large-capacity batteries by the technique of lamination. Furthermore, it does not employ any heavy metal such as cadmium or mercury causing environmental destruction, indicating that it is environment-friendly.

In general, LPB is composed of a negative electrode, a positive electrode and a polymer electrolyte, where the negative electrode includes lithium, carbon, etc., the positive electrode includes oxide of transition metal, metal chalcogen compound, conductive polymer, etc., and the polymer electrolyte comprises polymer, nonaqueous organic solvent (optionally), additives, etc., which has ion conductivity of about $10^{-3}$ to $10^{-8}$ S/cm at room temperature.

The polymer electrolyte, an essential component of LPB, is largely classified into a solvent-free polymer electrolyte and a plasticized polymer electrolyte. The solvent-free polymer electrolyte is composed of a polymer having polar groups and salts, where the polymer coats the salts and complex and ion is moved by the segment motion of polymer chain. On the other hand, the plasticized polymer electrolyte is composed of an excess amount of plasticizer, a polymer and salts, where the polymer plays a role as a supporter for the electrolyte and the salts are dissociated by the plasticizer to move ion.

Recently, extensive studies have been made on the economical and simple process for preparing a plasticized polymer electrolyte with a high ion conductivity at room temperature. However, the use of a polymer which plays a supporting role has proven to be less satisfactory in a sense that an excess amount of plasticizer is required to give a high ion conductivity, which brings about much difficulties in maintaining mechanical properties of the polymer. In this regard, a polymer electrode having a cross-linked structure has been proposed in the art. The plasticized polymer electrolyte with cross-linked structure has also revealed a shortcoming that its surface roughness is lager than that of a linear polymer electrolyte, indicating that its interfacial resistance with an electrode would be larger than that of linear polymer electrolyte and its interface characteristics under the electrical stress would be more unstable. In fact, Y. Aihara et al. reported that the plasticized polymer electrolyte was produced by plasticizing a random copolymer of ethylene oxide and propylene oxide with ethylene carbonate and propylene carbonate, whose interfacial resistance was measured about 1,000 to 1500Ω (see: Aihara Y., J. Power Source, 65:143, 1997).

Under the circumstances, there are strong reasons for exploring and developing an improved process for preparing LPB with lowered interfacial resistance between a plasticized polymer electrolyte and electrodes.

SUMMARY OF THE INVENTION

The present inventors have made an effort to solve the problems of the conventional processes for lowering the interfacial resistance between a plasticized polymer electrolyte and electrodes, and found that a lithium polymer secondary battery produced by direct coating of a placiticized and crosslinked polymer electrolyte onto a lithium electrode has a lowered interfacial resistance and improved interfacial stability under the electrical stress, while promoting the physical contact between the lithium electrode and the polymer electrolyte.

A primary object of the present invention is, therefore, to provide a process for preparing a lithium polymer secondary battery which comprises a step of direct coating of a plasticized and crosslinked polymer electrolyte onto a lithium electrode.

The other object of the invention is to provide a lithium polymer secondary battery prepared by the said process.

BRIEF DESCRIPTION OF THE DRAWINGS

The above and the other objects and features of the present invention will become apparent from the following descriptions given in conjunction with the accompanying drawings, in which.

DETAILED DESCRIPTION OF THE INVENTION

Figure 1:
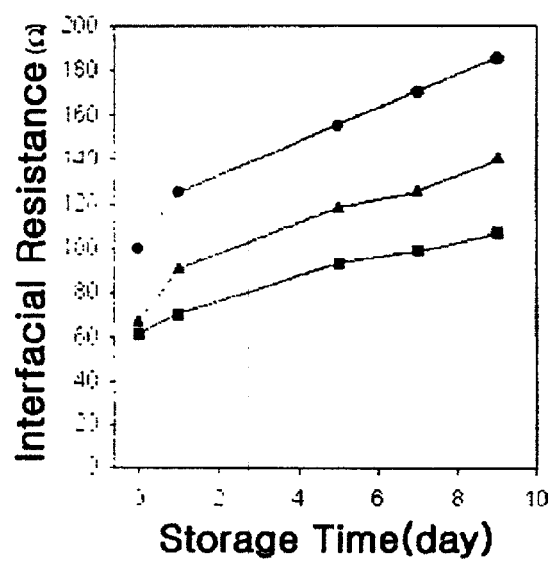
FIG. 1 is a graph showing the time-course of changes in interfacial resistance of each lithium symmetric cell.

The process for preparing a lithium polymer secondary battery of the present invention comprises: (i) dissolving a mixture of a crosslinking agent and a monomer in a molar ratio of 1:1 to 1:11 in a liquid electrolyte of 100 to 400% (w/w) to obtain a polymer electrolyte; (ii) applying the polymer electrolyte onto one side of a lithium electrode and treating with heat or UV to obtain a polymer-coated electrode; and, (iii) bonding the polymer-coated electrode to a positive electrode: The cross-linking agent is preferably polyethylene glycol dimethacrylate, polyethylene glycol diacrylate, divinyl benzene, polyester dimethacrylate, trimethylolpropane, trimethylolpropane trimethacrylate or mixture thereofs; the monomer is preferably methyl methacrylate, ethyl methacrylate, butyl methacrylate, methyl acrylate, ethyl acrylate, butyl acrylate, ethylene glycol methyl ether acrylate, ethylene glycol methyl ether methacrylate, acrylonitrile, vinyl acetate, vinyl chloride or mixture thereofs; the liquid electrolyte is prepared by dissolving lithium perchlorate, lithium hexafluoro phosphate, lithium triflate, lithium bis-trifluoromethylsulfonylimide, lithium borate, salts thereof or mixture thereofs in ethylene carbonate, propylene carbonate, dimethyl carbonate, ethylmethyl carbonate, diethyl carbonate, γ-butyrolactone, sulfolane, polyethylene glycol dimethylether, dimethyl sulfoxide, N-methylpyrrolidone or mixture thereofs.

The lithium polymer secondary battery of the present invention has a lower interfacial resistance and a higher surface stability than those of the lithium polymer secondary batteries produced by the conventional methods.

The present invention is further illustrated in the following examples, which should not be taken to limit the scope of the invention.

EXAMPLE 1
Preparation of Lithium Polymer Secondary Battery 0.5 g methylmethacrylate and 0.25 g polyethyleneglycol dimethacrylate were mixed, and dissolved in a liquid electrolyte which was prepared by dissolving lithium perchlorate in a mixture of ethylene carbonate and propylene carbonate (1:1, w/w) to reach a final concentration of 1M to obtain 2.25 g polymer electrolyte. Then, it was applied directly onto one side of a lithium electrode and irradiated with UV for 30 min to obtain a lithium electrode coated with a plasticized and crosslinked polymer electrolyte. And then, IPO electrode was deposited onto the surface of the lithium electrode, finally to give a lithium polymer secondary battery.

EXAMPLE 2
Measurement of Surface Resistance of Lithium Electrode Coated with Polymer Electrolyte A lithium symmetric cell(2 cm×2 cm in size) was prepared by sandwiching the coated lithium electrode prepared in Example 1 and measured the interfacial resistance.

COMPARATIVE EXAMPLE 1
Measurement of Interfacial Resistance Between a Lithium Electrode and a Polymer Electrolyte Film 2.25 g polymer electrolyte of Example 1 was casted to Teflon molder, and irradiated with UV to obtain a polymer electrolyte film. A lithium symmetric cell was prepared by sandwiching the polymer electrolyte film between the lithium electrode and composite cathode, and measured the surface resistance.

COMPARATIVE EXAMPLE 2
Measurement of Surface Resistance of a Lithium Electrode Treated with a Polymer Electrolyte Film and a Plasticizer Under a consideration that physical contact between an electrode and a polymer electrolyte is weakened by the surface roughness of cross-linked polymer electrolyte, a lithium electrode was treated with a plasticizer to improve physical contact between an electrode and a polymer electrolyte, and the polymer electrolyte film prepared in Comparative Example 1 was sandwiched between the electrodes treated with the plasticizer to obtain a lithium symmetric cell and measured the surface resistance(see: FIG. 1).

FIG. 1 is a graph showing the time-course of changes in surface resistance of lithium symmetric cells prepared in Example 2, Comparative Examples 1 and 2, where (■) indicates the changes in surface resistance of a lithium symmetric cell of Example 2; (●, that of a lithium symmetric cell of Comparative Example 1; and, (▲), that of Comparative Example 2. As shown in FIG. 1, interfacial resistance of the lithium symmetric cell employing an electrode coated with polymer electrolyte became significantly lower than that of lithium symmetric cell employing the polymer electrolyte film. In case of the cell employing an electrode treated with a plasticizer, the interfacial resistance was similar to that of the cell employing an electrode coated with polymer electrolyte, which was then significantly increased with the passage of time. Accordingly, it was clearly demonstrated that the cell employing an electrode coated with polymer electrolyte has the lowest interfacial resistance.

EXAMPLE 3
Comparison of Interfacial Stability

Figure 2:
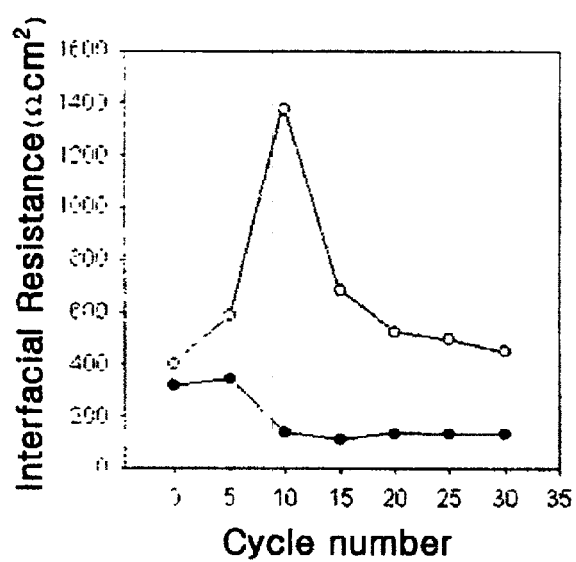
FIG. 2 is a graph showing the changes in interfacial resistance depending on the number of cycles.

Interfacial stability of the cell prepared in Example 2 was compared with that of the cell prepared in Comparative Example 1: Cyclic voltammetry test was carried out by repeated application of electrical stress under a condition of −3V to 3V voltage and 10 mV/sec voltage applying velocity and measured the interfacial resistance of the cell by frequency response analyzer(Solatron 1255 FRA) (see: FIG. 2). FIG. 2 is a graph showing the changes in interfacial resistance depending on the number of cycles(1 cycle=applied voltage from −3V to 3V), where (●) indicates interfacial resistance of a lithium symmetric cell of Example 2; (0), that of a lithium symmetric cell of Comparative Example 1. As shown in FIG. 2, interfacial resistance of a lithium symmetric cell of Comparative Example 1 increased abruptly with the number of 10 cycles, and decreased after 10 cycles, while interfacial resistance of the cell of Example 2 decreased with the number of cycles.

In the case of Comparative Example 1, the reason for the abrupt increase of interfacial resistance is that: the contact between a polymer electrolyte and a lithium electrode became unstablized by the surface roughness of polymer electrode film caused by a crosslinking reaction, and thereby the morphology of passive-state native layer formed by the reaction between the liquid electrolyte contained in the polymer electrolyte and the lithium electrode became ununiform. However, interfacial resistance was decreased after 15 cycles, since the voids between the polymer electrolyte and the lithium electrode was disappeared by forming a passive-state native layer sufficiently coated under the electrical stress.

On the other hand, in the case of Example 2, the reason for the decrease of interference resistance with the number of cycles is that: the problem of unstable contact between interfaces resulting in the surface roughness of polymer electrolyte was solved by the direct polymerization onto the lithium electrode, and the lithium surface renewal process removing a native layer on the surface of lithium under the electrical stress dominantly proceeded, and thereby the interface adhesion between polymer electrolyte and lithium electrode was promoted.

Accordingly, it was clearly demonstrated that a lithium symmetric cell prepared by direct polymerization of a polymer electrolyte on a lithium electrode has more excellent interfacial stability.

EXAMPLE 4
Comparison of Morphology of Native Layer

Figure 3A:
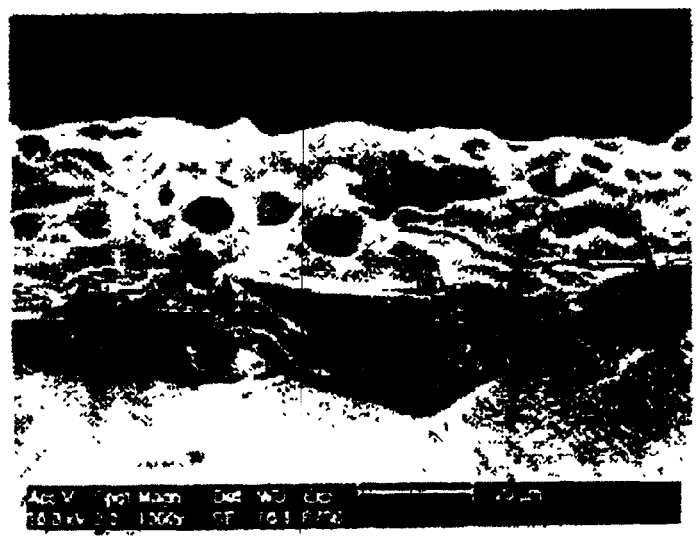
FIG. 3a is an electron microphotograph showing the cross-sectional view of a lithium symmetric cell of Comparative Example 1.
Figure 3B:
FIG. 3b is an electron microphotograph showing the cross-sectional view of a lithium symmetric cell of Example 1.

To compare morphology of native layer of a lithium symmetric cell of Example 2 with that of Comparative Example 1, electrical stress was applied on each lithium symmetric cell in the voltage range of −3V to 3V during 15 cycles, and the cross-section of each lithium symmetric cell was observed by electron microscopy(Philips SEM 535M) (see: FIGS. 3*a* and 3*b*). FIG. 3*a* is an electron microphotograph showing the cross-sectional view of a lithium symmetric cell of Comparative Example 1, and FIG. 3*b* is an electron microphotograph showing the cross-sectional view of a lithium symmetric cell of Example 2.

In the cross-sectional view of a lithium symmetric cell of Comparative Example 1(FIG. 3*a*), cracks were examined between a passive-state native layer and a polymer electrolyte. On the other hand, a polymer electrolyte and a passive-state native layer existed in a muatually-infiltrated form in the cross-sectional view of a lithium symmetric cell of Example 2(FIG. 3*b*), since the passive-state native layer was formed after the polymer electrolyte was coated onto the lithium electrode. Accordingly, it was clearly demonstrated that the contact between a passive-state native layer and a polymer electrolyte was significantly improved.

As clearly illustrated and demonstrated as above, the present invention provides a process for preparing a lithium polymer secondary battery, which comprises a step of direct coating of a plasticized and cross-linked polymer electrolyte onto a lithium electrode and a lithium polymer secondary battery produced thereby. The process for preparing a lithium polymer secondary battery comprises the steps of: (i) dissolving a mixture of a crosslinking agent and a monomer in a molar ratio of 1:1 to 1:11 in a liquid electrolyte of 100 to 400% (w/w) to obtain a polymer electrolyte; (ii) applying the polymer electrolyte onto one side of a lithium electrode and treating with heat or UV to obtain a polymer-coated electrode; and, (iii) bonding the polymer-coated electrode to a positive electrode. In accordance with the present invention, a lithium polymer secondary battery with an improved interfacial stability between a lithium electrode and a polymer electrolyte can be prepared in a simple manner, which makes possible its wide application in the development of lithium polymer secondary battery.

What is claimed is:

1. A process for preparing a lithium polymer secondary battery which comprises the steps of:

(i) dissolving a mixture of a crosslinking agent and a monomer in a molar ratio of 1:1 to 1:11 an a liquid electrolyte with a weight ratio of 1:1 to 1:4, to obtain a crosslinked polymer electrolyte;

(ii) directly coating the polymer electrolyte onto one side of a lithium electrode and treating with heat or UV to obtain an electrode directly coated with the crosslinked polymer; and (iii) bonding the electrode directly coated with the crosslinked polymer to a positive electrode, wherein the lithium polymer secondary battery has a lower interfacial resistance between the electrode and the crosslinked polymer.

2. The process for preparing a lithium polymer secondary battery of claim 1, wherein the cross-linking agent is polyethylene glycol dimethacrylate, polyethylene glycol diacrylate, divinyl benzene, polyester dimethacrylate, trimethylolpropane, trimethylolpropane trimethacrylate or mixtures thereof.

3. The process for preparing a lithium polymer secondary battery of claim 1, wherein the monomer is methyl methacrylate, ethyl methacrylate, butyl methacrylate, methyl acrylate, ethyl acrylate, butyl acrylate, ethylene glycol methyl ether acrylate, ethylene glycol methyl ether methacrylate, acrylonitrile, vinyl acetate, vinyl chloride or mixtures thereof.

4. The process for preparing a lithium polymer secondary battery of claim 1, wherein the liquid electrolyte is prepared by dissolving lithium perchlorate, lithium hexafluorophosphate, lithium triflate, lithium bis-trifluoromethylsulfonylimide, lithium borate, salts thereof, or mixtures thereof in ethylene carbonate, propylene carbonate, dimethyl carbonate, ethylmethyl carbonate, diethyl carbonate, γ-butyrolactone, sulfolane, polyethylene glycol dimethylether, dimethyl sulfoxide, N-methylpyrrolidone or mixtures thereof.

5. A lithium polymer secondary battery prepared by the process of claim 1.

* * * * *